Sept. 20, 1955  H. J. MURPHY  2,718,044
FASTENING DEVICE
Filed Aug. 2, 1952

INVENTOR:
HOWARD J. MURPHY,
By Robert E Ross
ATTORNEY.

United States Patent Office 2,718,044
Patented Sept. 20, 1955

2,718,044

FASTENING DEVICE

Howard J. Murphy, Lynnfield, Mass., assignor, by mesne assignments, to United-Carr Fastener Corporation, Boston, Mass., a corporation of Delaware Application August 2, 1952, Serial No. 302,301

1 Claim. (Cl. 24—218)

This invention relates generally to fastening devices, and has particular reference to a snap fastener socket of the three-side-lock type.

Snap fastener sockets of this type are commonly formed of a sheet metal shell having a ring spring assembled therewith to receive a shouldered stud in snapping engagement. Various means are provided to impart a so-called three-side-lock feature to the socket, so that the stud and socket can be separated only by a disengaging force applied to one predetermined side of the assembled stud and socket.

When such sockets are used on military clothing or equipment, it has been found that the fastener is frequently rendered inoperative when the socket becomes filled with dirt, mud, sand, or the like. Since the spring of the socket must expand to pass over the head of the stud during engagement or disengagement, mud retained in the socket between the spring and the housing will prevent the spring from expanding. Hence, in such circumstances the stud cannot be assembled into the socket, or if already assembled, it cannot become disengaged from the socket.

Another disadvantage of such sockets is that their action, that is, the force required to unsnap the stud from the socket, is not as uniform as is desired, since the orientation of the spring can vary in relation to the unlocking side of the socket. When the ends of the spring are disposed on the locking side, for example, the action of the fastener is considerably harder than it is when the ends of the spring are disposed on the unlocking side. The action of the fastener is also influenced by the size and position of the burrs on the ends of the spring resulting from the cutting off of the spring during the forming thereof.

The object of the invention is to provide an improved three-side-lock socket which eliminates the above disadvantages, in that the operation of the fastener is not affected by mud and dirt, and having a construction that provides a uniform action at all times.

Figure 1:
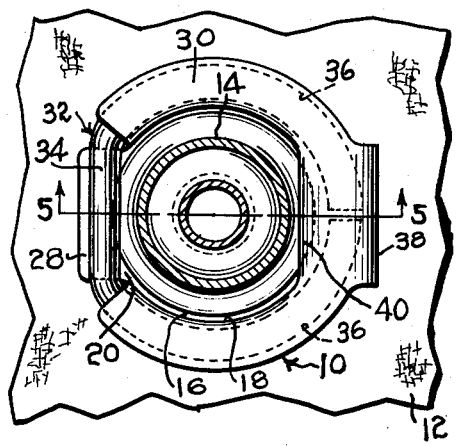
Fig. 1 is a top plan view of a socket member embodying the features of the invention having an assembled stud shown in section.
Figure 2:
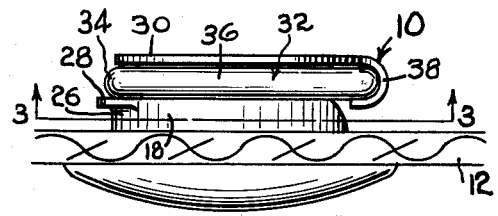
Fig. 2 is a view in side elevation of the socket of Fig. 1.
Figure 3:
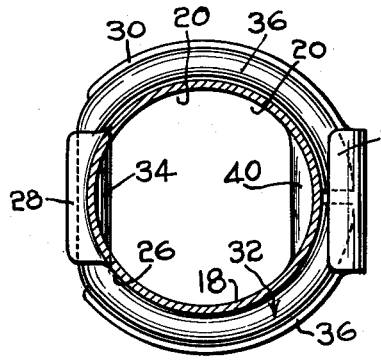
Fig. 3 is a view in section taken on line 3—3 of Fig. 2.

Referring to the drawing, there is illustrated a three-side lock socket 10, which is adapted for attachment to a supporting sheet 12, to receive a shouldered stud 14 in snapping engagement.

The socket 10 comprises a sheet metal body formed by a base 16 and an upstanding peripheral wall 18 disposed about the base, forming a stud-receiving opening 20. The base 16 is provided with an opening 22 to receive an attaching member 24 for securing the socket to the sheet 12.

The wall 18 is provided with a lower step portion 26 on one side of the socket, which may have an outwardly turned lip 28 disposed thereon for a purpose to appear hereinafter. The rest of the wall is provided with a peripheral flange 30 disposed on the upper edge thereof.

To provide means for snapping engagement with the inserted stud 14, a spring 32 is assembled about the exterior of the body, and comprises a substantially straight medial portion 34 which is disposed on the lower portion 26 of the wall, and extends across an edge of the opening 20. End portions 36 of the spring extend from the medial portion and encircle the wall 18 under the flange 30, to terminate on the opposite side of the socket. A tongue 38 extends from the flange on said opposite side and is curled around the spring. The spring is thereby retained between the flange 30 on one side and the tongue 38 and the lower portion 26 of the wall on the other side, to maintain the spring in suitable spaced relation to the base.

To impart a three-side-lock feature to the socket, an embossed detent 40 is formed in the wall on the side opposite the medial portion of the spring which is disposed in suitable spaced relation to the base so that the shoulder of an assembled stud can seat between the detent and the base.

Figure 5:
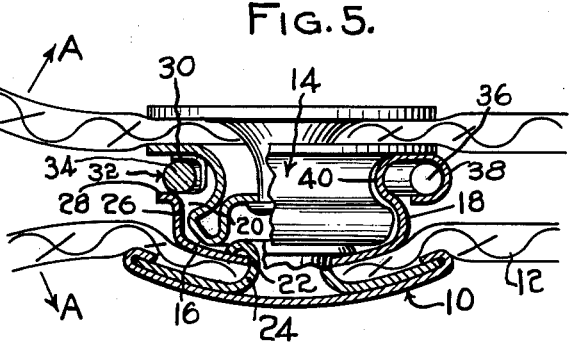
Fig. 5 is a view in section taken on line 5—5 of Fig. 1.
Figure 4:
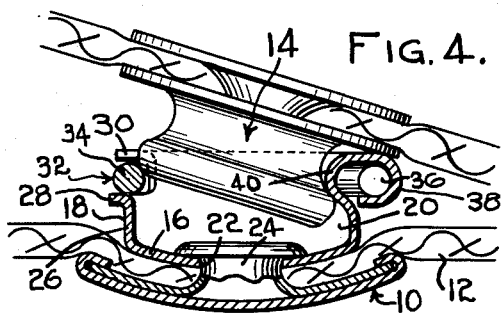
Fig. 4 is a view in elevation, partly in section, of a stud and the socket of Fig. 2 in position for assembly.

As illustrated in Fig. 4, the stud 14 is assembled into the socket by inserting the stud into the socket in an inclined position, so that the shoulder of the stud can pass behind the detent 40. The shoulder on the opposite side of the stud may then be snapped past the medial portion 34 of the spring. Disassembly of the stud and socket may be accomplished only by a disengaging force applied to the assembly on the side having the medial portion of the spring, as illustrated by arrows A in Fig. 5. Disengagement by separating forces applied on any other side is prevented by the engagement of the shoulder of the stud with the detent 40.

It will be readily seen that although mud may enter the opening 20, it may be readily removed to permit assembly of the stud, since the structure of the body, with the spring disposed about the exterior thereof eliminates the possibility that retained mud will interfere with the action of the spring. If the fastener becomes coated with mud while the stud is assembled, the stud may nevertheless be easily removed.

Although the principal advantage of the fastener is its ability to operate when coated with mud, there are other advantages of the illustrated construction. The action of the fastener is more uniform than previous fasteners of this type, since burrs occurring on the ends of the spring resulting from cutting off of the spring during forming cannot at any time come in contact with the stud to cause irregularities in the action. The spring is also non-rotatable in relation to the socket, so that the stud, during disengagement, always contacts the medial portion 34.

Since certain other obvious changes may be made in the device without departing from the scope of the invention, it is intended that all matter contained herein be interpreted in an illustrative and not in a limiting sense.

I claim:

A three-side-lock snap fastener socket comprising a hollow body having a stud-receiving opening formed by a base and an upstanding peripheral wall having a radially extending flange at the upper edge thereof, said wall having a lower portion disposed on one side of the body, a spring disposed about the exterior of the body, said spring having a substantially straight medial portion disposed on the lower portion of the wall and extending across an edge of the opening for snapping engagement with an inserted shouldered stud, and end portions encircling the wall under the flange to terminate on the opposite side of the body, a spring retaining tongue disposed on the body on said opposite side and encircling the spring, and an embossed detent formed in the wall on said opposite side and extending into the opening to engage the shoulder of an inserted stud to prevent disengagement of the stud and socket by a separating force applied on said opposite side.

References Cited in the file of this patent

UNITED STATES PATENTS

| | | |
|---|---|---|
| 572,735 | Thompson | Dec. 8, 1896 |

FOREIGN PATENTS

| | | |
|---|---|---|
| 691,928 | France | July 22, 1930 |